(12) United States Patent
Maeda

(10) Patent No.: US 8,618,754 B2
(45) Date of Patent: Dec. 31, 2013

(54) MOTOR CONTROL APPARATUS AND IMAGE FORMING APPARATUS

(75) Inventor: Yoritsugu Maeda, Moriya (JP)

(73) Assignee: Canon Kabushiki Kaisha, Tokyo (JP)

( * ) Notice: Subject to any disclaimer, the term of this patent is extended or adjusted under 35 U.S.C. 154(b) by 559 days.

(21) Appl. No.: 12/823,956

(22) Filed: Jun. 25, 2010

(65) Prior Publication Data

US 2010/0329724 A1    Dec. 30, 2010

(30) Foreign Application Priority Data

Jun. 30, 2009   (JP) ................................ 2009-155305

(51) Int. Cl.
*H02P 6/00* (2006.01)
*H02P 5/00* (2006.01)
*H04N 1/40* (2006.01)
*H02P 7/29* (2006.01)
*G05F 1/10* (2006.01)
*G03G 15/00* (2006.01)

(52) U.S. Cl.
USPC .......... 318/400.01; 318/5; 358/471; 388/811; 388/823; 399/167

(58) Field of Classification Search
USPC .......... 318/400.01, 5; 358/471; 388/811, 823; 399/167
See application file for complete search history.

(56) References Cited

U.S. PATENT DOCUMENTS

| 7,365,505 B2 | 4/2008 | Okamoto | |
| 2002/0080420 A1* | 6/2002 | Yokochi | ........................ 358/471 |
| 2004/0090127 A1* | 5/2004 | Ueno | ............................... 310/12 |
| 2008/0112697 A1* | 5/2008 | Kim | ................................ 388/823 |
| 2011/0038652 A1* | 2/2011 | Kobayashi et al. | ........... 399/167 |

FOREIGN PATENT DOCUMENTS

| JP | 01-225973 A | 9/1989 |
| JP | 05-219785 A | 8/1993 |
| JP | 7-039181 A | 2/1995 |
| JP | 07-213085 A | 8/1995 |
| JP | 2007-156238 A | 6/2007 |

OTHER PUBLICATIONS

U.S. Appl. No. 12/707,362, filed Feb. 17, 2010, Yoritsugu Maeda.

* cited by examiner

*Primary Examiner* — Lincoln Donovan
*Assistant Examiner* — Gabriel Agared
(74) *Attorney, Agent, or Firm* — Canon USA Inc. IP Division

(57) ABSTRACT

A motor control apparatus that controls a DC motor includes a detection unit configured to detect angular speed of the DC motor, a driven member configured to be driven by the DC motor, and a control unit configured to increase, when starting to drive the DC motor, a control value for controlling driving of the DC motor from a first control value to a second control value at a predetermined increase rate, wherein the control unit detects a start-up characteristic of the DC motor based on a detection result of the detection unit, and corrects the first control value or the increase rate according to a result of comparing a detected start-up characteristic and a predetermined start-up characteristic such that the start-up characteristic of the DC motor becomes closer to the predetermined start-up characteristic.

10 Claims, 14 Drawing Sheets

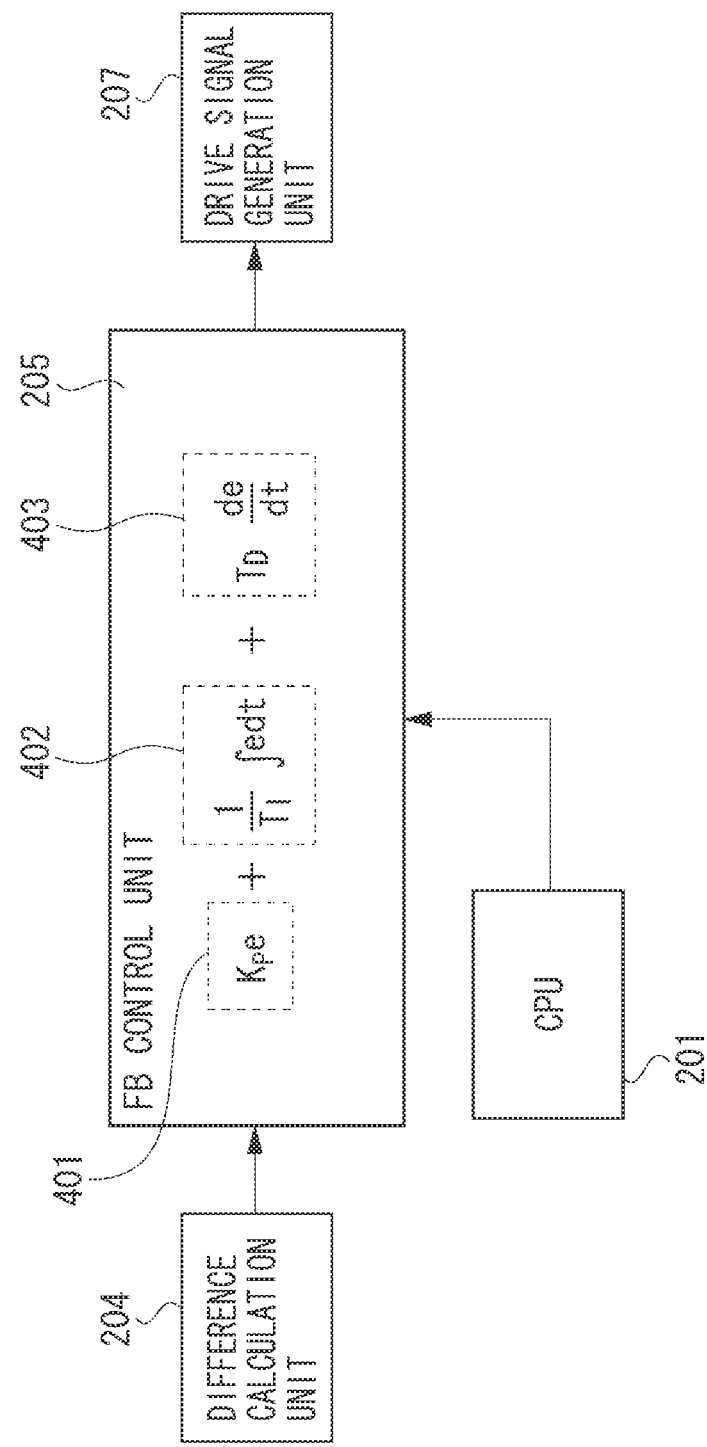

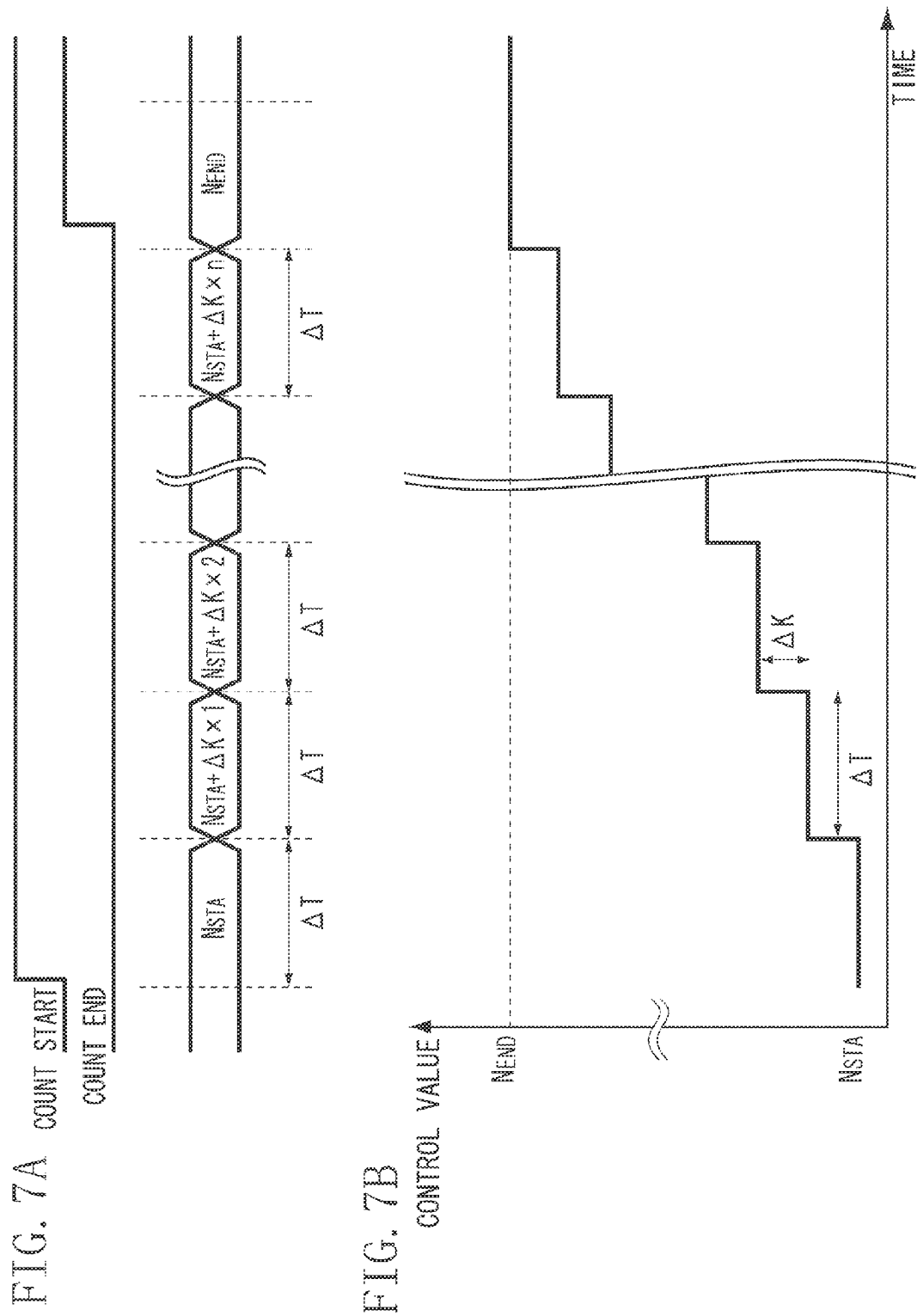

MOTOR CONTROL APPARATUS AND IMAGE FORMING APPARATUS

BACKGROUND OF THE INVENTION

1. Field of the Invention

The present invention generally relates to motor control and image forming and, more particularly, to a motor control apparatus that controls a direct current (DC) motor, and an image forming apparatus that includes the motor control apparatus.

2. Description of the Related Art

There are copying machines and printers which form a toner image on a photosensitive drum, transfer the toner image to an intermediate transfer belt, and then transfer the toner image from the intermediate transfer belt to a recording material. Such copying machines and printers may be configured so that the photosensitive drum and the intermediate transfer belt are driven by separate motors to achieve high image quality.

The photosensitive drum and the intermediate transfer belt in the above-described copying machines and printers are in contact with each other at a transfer position. The photosensitive drum and the intermediate transfer belt may thus become scratched if there is a difference in peripheral speeds thereof.

Such a problem does not occur when the peripheral speeds of the photosensitive drum and the intermediate transfer belt are controlled at target speeds. However, if the photosensitive drum and the intermediate transfer belt are driven by separate DC motors, start-up of driving each of the DC motors becomes different and thus unstable.

There are various methods of stabilizing the start-up of driving the DC motor. Japanese Patent Application Laid-Open No. 7-039181 discusses increasing, when starting to drive the motor, a pulse width modulation (PWM) signal that controls rotation speed of the motor. The PWM signal is increased from a low on-duty ratio at a predetermined rate to start driving the DC motor in a shorter time with less overshoot.

Further, Japanese Patent Application Laid-Open No. 2007-156238 discusses controlling a clock frequency input to the motor to be lower than a target frequency when starting to drive the DC motor. The clock frequency is then increased to the target frequency.

If control is performed when driving of the motor is started so that the control value is increased from a low control value to the target control value, an angular speed of the DC motor linearly increases to a certain point. However, the angular speed increases non-linearly when approaching the target angular speed. As a result, the peripheral speed difference is generated between the photosensitive drum and the intermediate transfer belt during the period of non-linear increase.

SUMMARY OF THE INVENTION

According to an aspect of the present invention, a motor control apparatus which controls a DC motor includes a detection unit configured to detect the angular speed of the DC motor, a driven member configured to be driven by the DC motor, and a control unit configured to increase, when starting to drive the DC motor, a control value for controlling driving of the DC motor from a first control value to a second control value at a predetermined increase rate, wherein the control unit detects a start-up characteristic of the DC motor based on a detection result of the detection unit, and corrects the first control value or the increase rate to according to a result of comparing a detected start-up characteristic and the predetermined start-up characteristic such that the start-up characteristic of the DC motor becomes closer to the predetermined start-up characteristic.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 6 is a block diagram illustrating a process performed by the FB control unit 205 of FIG. 3.

FIGS. 7A and 7B illustrate a process performed by the slope generation unit 206 of FIG. 3.

DESCRIPTION OF THE EMBODIMENTS

Various exemplary embodiments, features, and aspects of the invention will be described in detail below with reference to the drawings.

Figure 1:
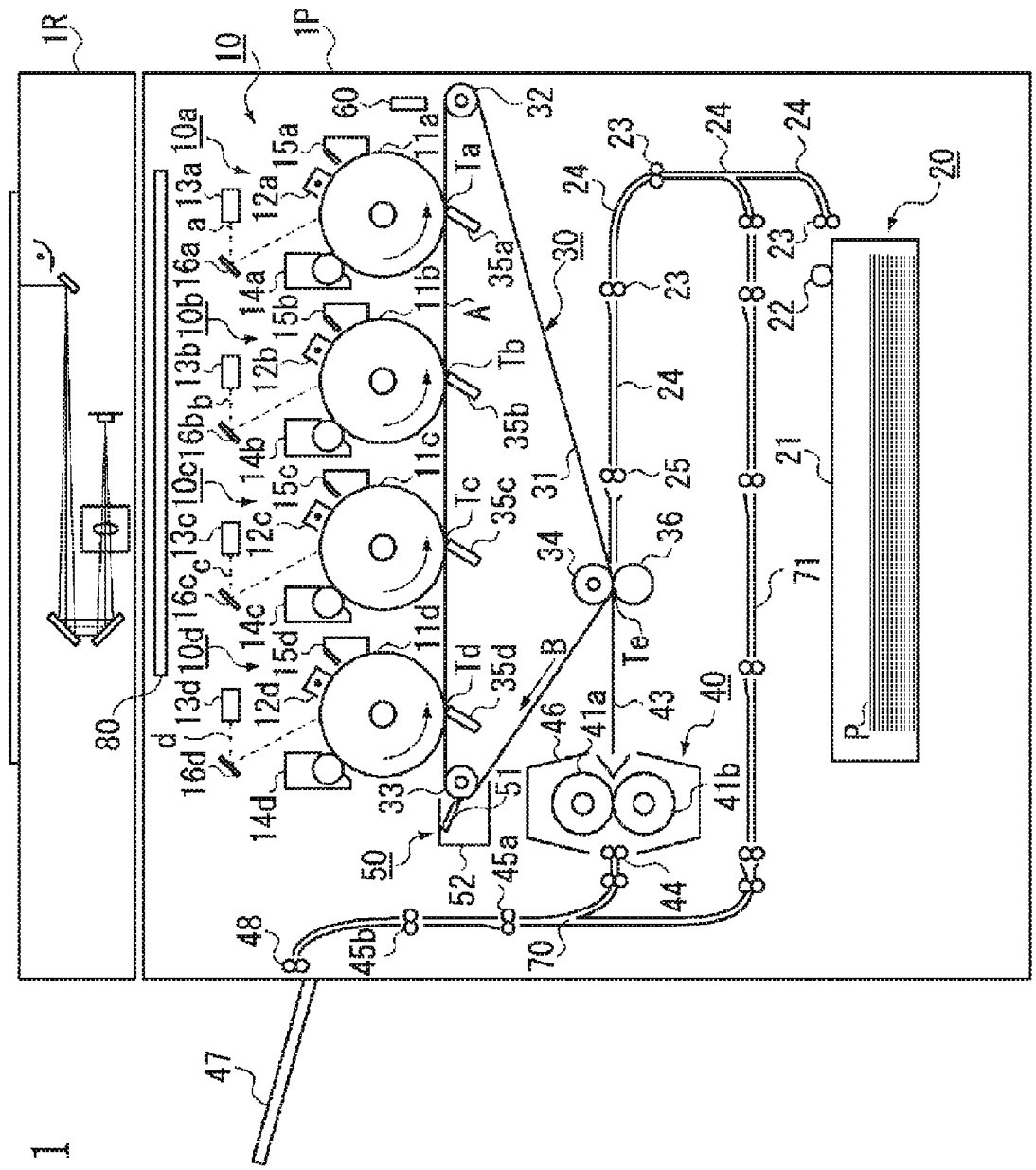
FIG. 1 illustrates a cross-sectional view of a color copying machine according to an exemplary embodiment of the present invention.

FIG. 1 is a cross-sectional view illustrating an image forming apparatus in the form of a color copying machine example according to an exemplary embodiment of the present invention. The color copying machine includes a plurality of image forming units disposed in parallel and employs an intermediate transfer system. The color copying machine includes an image reading unit 1R and an image output unit 1P. While a color copying machine is shown as an example of the exemplary embodiment of an image forming apparatus according to the present invention, the present invention is not restricted to a color copying machine only, and may be provided in a variety of other configurations including but not limited to a copying machine, a printer, a color or monochrome multi-function device, and/or the like.

The image reading unit 1R optically reads an original image, converts the read image into electrical signals, and transmits the signals to the image output unit 1P. The image output unit 1P includes a plurality of image forming units 10 (10a, 10b, 10c and 10d) disposed in parallel, a sheet feeding unit 20, an intermediate transfer unit 30, a fixing unit 40, and a cleaning unit 50.

The configuration of each image forming unit 10 (10a, 10b, 10c and 10d) is the same. Photosensitive drums 11 (11a, 11b, 11c, and 11d), i.e., first image bearing members, are each pivotally supported in the center of each image forming unit 10 and are rotationally driven in the direction indicated by arrows illustrated in FIG. 1.

Primary charging devices 12 (12a, 12b, 12c, and 12d), exposure units 13 (13a, 13b, 13c, and 13d), reflection mirrors 16 (16a, 16b, 16c, and 16d), developing apparatuses 14 (14a, 14b, 14c, and 14d), and cleaning apparatuses 15 (15a, 15b, 15c, and 15d) are disposed facing the peripheral surface of the photosensitive drums 11a, 11b, 11c, and 11d, in the rotational direction thereof.

The primary charging devices 12a, 12b, 12c, and 12d apply electrical charge of a uniform charge amount to the surfaces of the photosensitive drums 11a, 11b, 11c, and 11d. The exposure units 13a, 13b, 13c, and 13d then expose the photosensitive drums 11a, 11b, 11c, and 11d via the reflection mirrors 16a, 16b, 16c, and 16d with laser beams that are modulated according to recording image signals. As a result, electrostatic latent images are formed on the photosensitive drums 11a, 11b, 11c, and 11d.

The developing apparatuses 14a, 14b, 14c, and 14d that contain developers (hereinafter referred to as toner) of the four colors yellow, cyan, magenta and black respectively, then visualize the electrostatic latent images formed on the photosensitive drums 11a, 11b, 11c, and 11d. The visualized visible images (toner images) are transferred to an intermediate transfer belt 31, i.e., a second image bearing member, in the intermediate transfer unit 30 at image transfer positions Ta, Tb, Tc and Td respectively.

The cleaning apparatuses 15a, 15b, 15c and 15d disposed downstream from the image transfer positions Ta, Tb, Tc, and Td scrape off the toner that was not transferred to the intermediate transfer belt 31 and remains on the photosensitive drums 11a, 11b, 11c, and 11d to clean the surface of the drums. By the above-described process, the images are sequentially formed by each toner.

The sheet feeding unit 20 includes a cassette 21 for containing the recording material P, a pickup roller 22 that sends forward the recording material P one sheet at a time from the cassette 21, and sheet feeding roller pairs 23 that further conveys the recording material P sent from the pickup roller 22. Further, the sheet feeding unit 20 includes a sheet feeding guide 24 and registration rollers 25 that send the recording material P to a secondary transfer position Te in time with the image on the intermediate transfer belt 31.

The intermediate transfer belt 31 in the intermediate transfer unit 30 is supported by a drive roller 32 that transmits a driving force to the intermediate transfer belt 31, a driven roller 33 that is driven by the rotation of the intermediate transfer belt 31, and a secondary transfer opposing roller 34. A primary transfer plane A is formed between the drive roller 32 and the driven roller 33. The drive roller 32 is rotationally driven by a pulse motor (not illustrated).

Primary transfer charging devices 35 (35a, 35b, 35c, and 35d) are disposed on the underside of the intermediate transfer belt 31 at each primary transfer positions Ta, Tb, Tc, and Td at which the intermediate transfer belt 31 faces the photosensitive drums 11a, 11b, 11c, and 11d. A secondary transfer roller 36 is disposed facing the secondary transfer opposing roller 34, so that a secondary transfer position Te is formed by the nip between the intermediate transfer belt 31 and the secondary transfer roller 36. The secondary transfer roller 36 is pressed with a suitable degree of pressing force against the intermediate transfer belt 31.

A cleaning unit 50 for cleaning the image forming surface of the intermediate transfer belt 31 is disposed downstream from the secondary transfer position Te on the intermediate transfer belt 31. The cleaning unit 50 includes a cleaning blade 51 for scraping off toner remaining on the intermediate transfer belt 31 and a waste toner box 52 for storing waste toner scraped off by the cleaning blade 51.

The fixing unit 40 includes a fixing roller 41a that contains an inner heat source such as a halogen heater, and a fixing roller 41b that is pressed against the fixing roller 41a. The fixing unit 40 also includes a guide 43 that guides the recording material P to a nip portion of the fixing roller pair 41a and 41b, and a fixing unit insulation cover 46 that confines the heat of the fixing unit 40 within. The fixing unit 40 further includes internal discharge rollers 44 to further guide the recording material P that was discharged from the fixing roller pair 41a and 41b to outside of the apparatus, vertical path rollers 45a and 45b, a discharge roller 48, and a discharge tray 47 for stacking the recording material P.

The operations of the above-described color copying machine will be described below. When a central processing unit (CPU, not shown) issues an image formation operation start signal, a sheet feeding operation is started from the cassette 21. More specifically, the pickup roller 22 sends out the recording material P one sheet at a time from the cassette 21. The sheet feeding rollers pairs 23 then guides the recording material P along the sheet feeding guide 24 to be conveyed to the registration rollers 25.

The leading edge of the recording material P abuts against the nip portion between the registration rollers 25 that are not rotating. The registration rollers 25 then start rotating in time with the image formed on the intermediate transfer belt 31. Timing at which the registration rollers 25 starts rotating is set so that the recording material P and the toner image on the intermediate transfer belt 31 meet each other exactly at the secondary transfer position Te.

Further, when the CPU issues the image forming start signal, the primary transfer charging device 35d primary transfers the toner image formed on the photosensitive drum 11d to the intermediate transfer belt 31 at the primary transfer position Td.

The primary transferred toner image is then conveyed to the next primary transfer position Tc. At the primary transfer position Tc, the image is formed after delaying for an amount of time in which the toner image is conveyed between each image forming units 10. The next toner image is then transferred on top of the preceding image by aligning the position. The same process is repeated in the other image forming units so that the toner images of four colors are primary transferred to the intermediate transfer belt 31.

The recording material P then enters the secondary transfer position Te, and upon contact with the intermediate transfer belt 31, a high voltage is applied to the secondary transfer roller 36 at timing of the recording material P passing through the secondary transfer position Te. As a result, the toner images of four colors transferred to the intermediate transfer belt 31 by the above-described process are transferred onto the surface of the recording material P.

The conveying guide 43 then guides the recording material P to the nip portion of the fixing rollers 41a and 41b, and the toner image is fixed onto the surface of the recording material P by the heat of the fixing rollers 41a and 41b and the pressure of the nip. The discharge roller 44, the vertical paths rollers 45a and 45b, and the discharge roller 48 convey and discharge the recording material P to outside the apparatus to be stacked on the discharge tray 47.

Driving of the photosensitive drum 11 by the motor control apparatus included in the image forming apparatus will be described below with reference to FIG. 2. According to the present exemplary embodiment, the motor 100, such as a DC brushless motor or the like, is provided for each of the photosensitive drums 11 (11a, 11b, 11c, and 11d), i.e., driven members, and the drive roller 32 (which drives the intermediate transfer belt 31).

Figure 2:
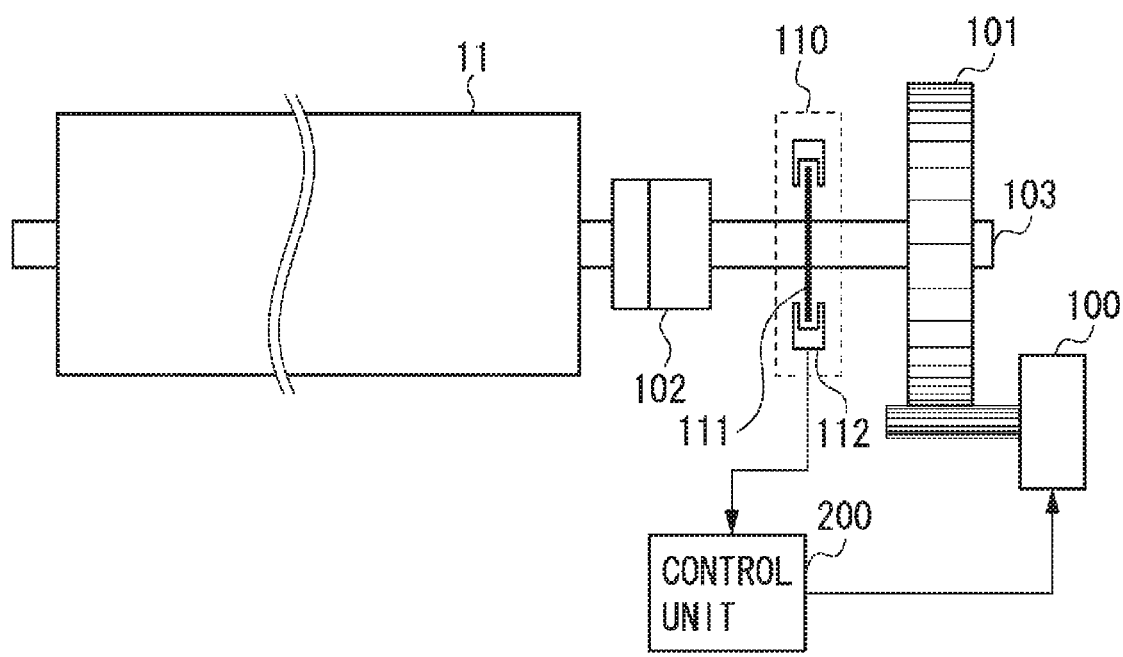
FIG. 2 illustrates a configuration for driving a photosensitive drum 11 according to an exemplary embodiment of the present invention.

Referring to FIG. 2, the motor 100 is controlled by a control unit 200. The driving force of the motor 100 is transmitted to the photosensitive drum 11 via a gear 101, a drive shaft 103, and a coupling 102. As a result, the photosensitive drum 11 is rotated.

An encoder wheel 111 is fixed on the drive shaft 103, so that the drive shaft 103 and the encoder wheel 111 rotate at the same angular speed. An encoder 110 includes the encoder wheel 111 and an encoder sensor 112. The encoder wheel 111 is a transparent disk on which black radial lines are equiangularly printed.

The encoder sensor 112 includes a light emitting unit and a light receiving unit disposed to sandwich the encoder wheel 111. When the black portion of the disk reaches the position of the light receiving unit, light is blocked from entering the light receiving unit. When the transparent portion of the disk reaches the position of the light receiving unit, the light enters the light receiving unit. The encoder sensor 112 generates a signal according to whether the light entered the light receiving unit.

As described above, the encoder 110 supplies to the control unit 200 a signal with a cycle corresponding to the angular speed of the drive shaft 103. The control unit 200 then controls the motor 100 based on the signal from the encoder 110.

Figure 3:
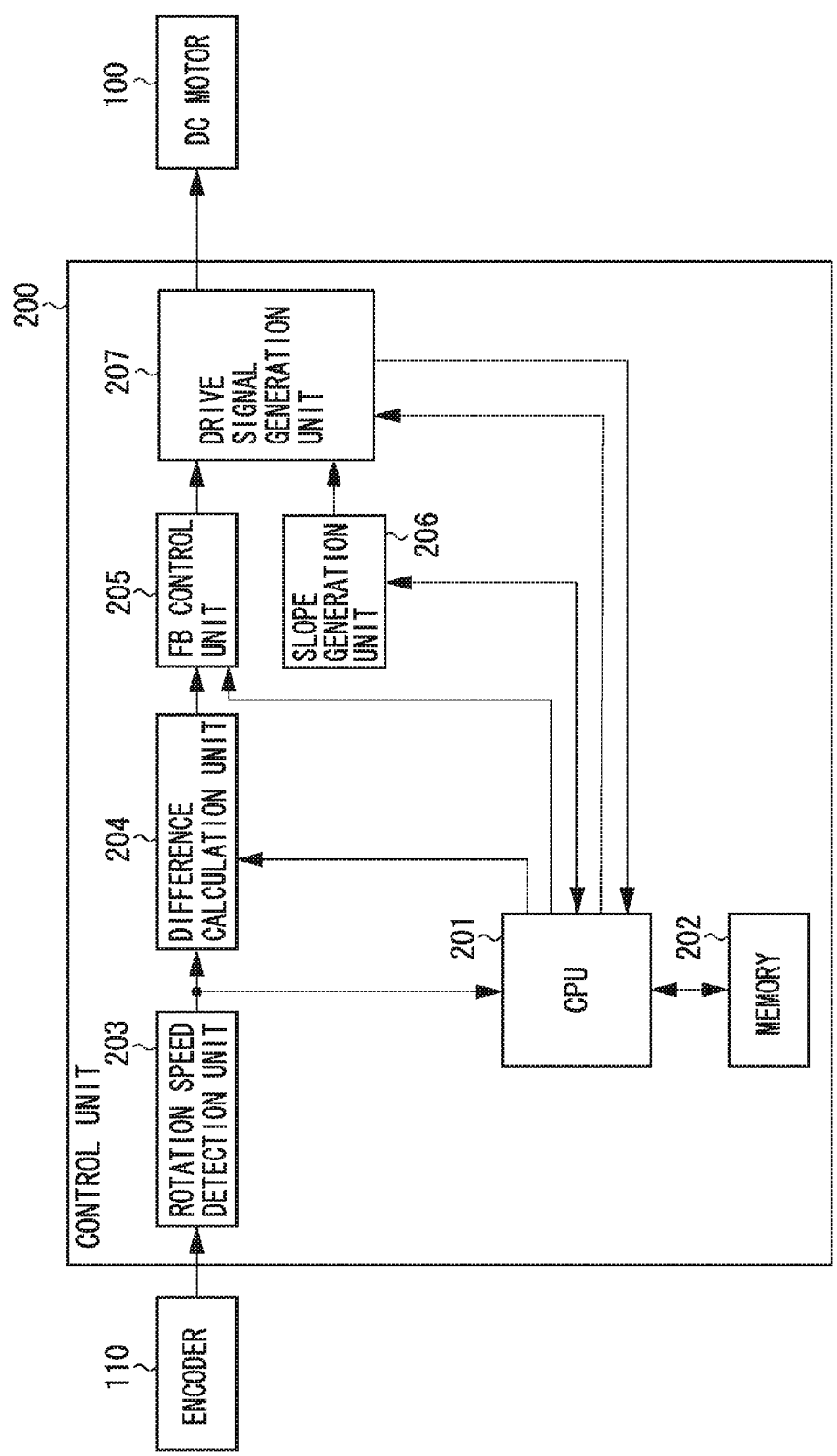
FIG. 3 is a block diagram illustrating the control unit 200 that controls the motor 100 illustrated in FIG. 2.
Figure 4:
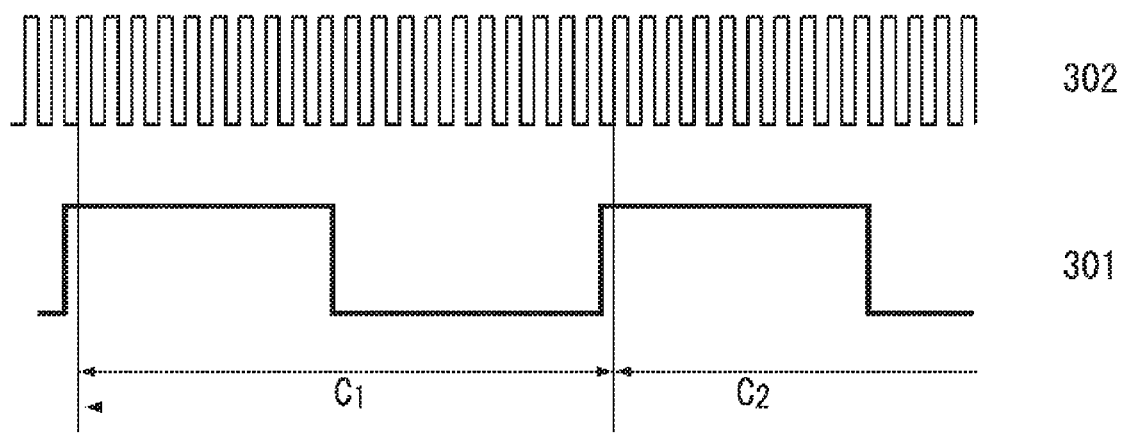
FIG. 4 illustrates detection by the rotation speed detection unit 203 of FIG. 3.

FIG. 3 is a block diagram illustrating the control unit 200. Referring to FIG. 3, the rotation speed detection unit 203 detects the cycle of a pulse signal output from the encoder 110. The rotation speed detection unit 203 detects the cycle of a pulse signal 301, illustrated in FIG. 4, by counting a number of clocks 302 within one cycle of the pulse signal 301 (i.e., $C_1$ from a leading edge to the next leading edge of the pulse signal 301).

The clock 302 is a pulse signal of a constant cycle, which is shorter than the cycle of the pulse signal 301. The clock 302 is generated by a crystal oscillator and is input to the rotation speed detection unit 203 of FIG. 2.

Figure 5A:
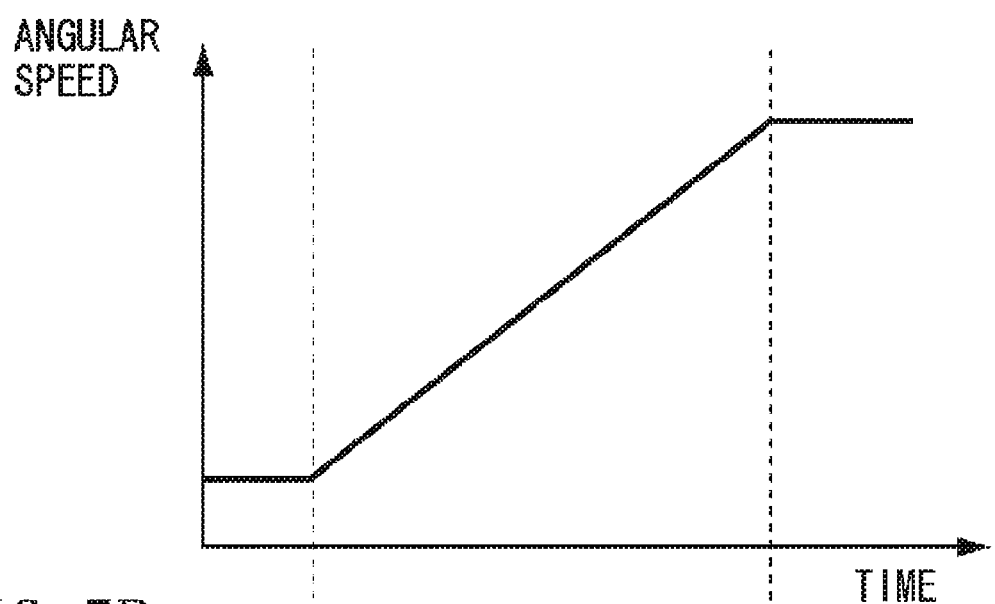
FIGS. 5A and 5B are graphs illustrating a relation between number of counts and angular speed of the rotation speed detection unit 203 of FIG. 3.
Figure 5B:
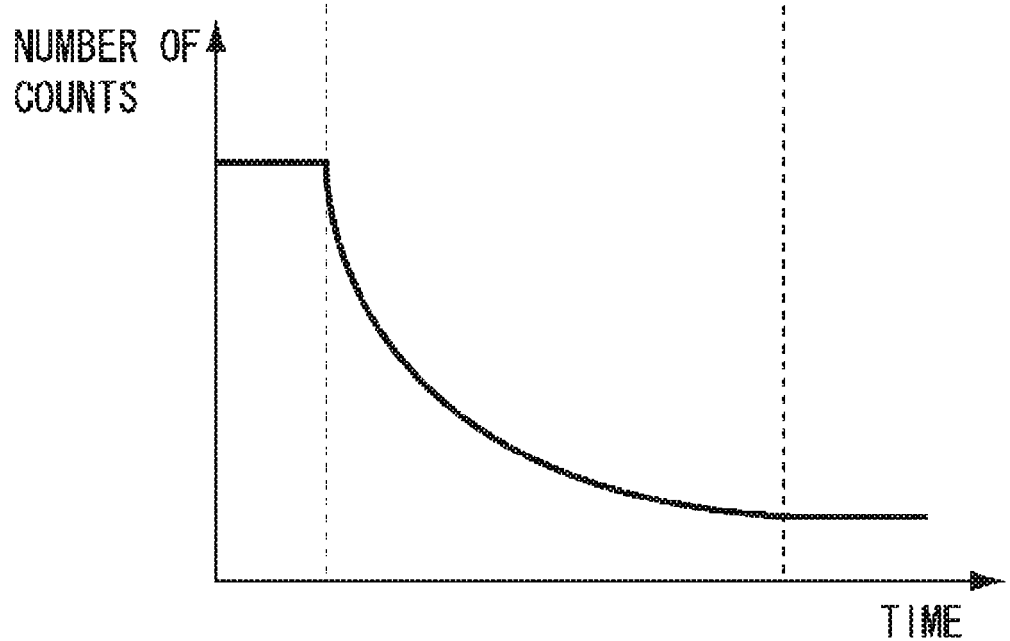

The rotation speed detection unit 203 then calculates the angular speed from a detected pulse width. FIG. 5A illustrates a change in the angular speed of the drive shaft 103 when the motor 100 is started to be driven, and FIG. 5B illustrates a number of counts (pulse period) counted at that time by the rotation speed detection unit 203. Referring to FIG. 5A, the angular speed increases with time, and referring to FIG. 5B, the number of counts decreases inversely with time.

There is thus an inverse relationship between the angular speed and the number of counts, and the angular speed is calculated based on equation 1 described below. The rotation speed detection unit 203 then outputs the detected angular speed to a difference calculation unit 204 and a CPU 201. K is a given coefficient in equation (1).

$$\text{Angular speed} = K/\text{number of counts} \quad (1)$$

The difference calculation unit 204 of FIG. 2 calculates the difference between the detected angular speed output from the rotation speed detection unit 203 and the target angular speed supplied from the CPU 201. A feedback (FB) control unit 205 calculates a correction control value necessary for the drive shaft 103 to rotate at the target angular speed. The FB control unit 205 calculates the correction control value based on the difference value output from the difference calculation unit 204 and feedback gain values ($K_p$, $T_I$, and $T_D$) supplied from the CPU 201.

A drive signal generation unit 207 generates a pulse width modulation (PWM) control signal of a duty based on a control value acquired by adding the correction control value output from the FB control unit 205 and a target control value $N_{TAG}$ output from the CPU 201, or the control value output from a slope generation unit 206. The PWM control signal is used for performing PWM control of the motor 100.

The slope generation unit 206 outputs a control value, which increases at a constant ratio along with time. The control value acquired by adding the correction control value output from the FB control unit 205 to the target control value $N_{TAG}$ output from the CPU 201 is used when rotating the motor 100 at a constant angular speed. Further, the control value output from the slope generation unit 206 is used when starting to drive the motor 100.

FIG. 6 illustrates a process performed by the FB control unit 205. The FB control unit 205 performs proportional-integral-differential (PID) control based on the difference value output from the difference calculation unit 204. The control value used in performing the PID control is calculated based on equation (2).

$$K_P e + \frac{1}{T_I} \int e \, dt + T_D \frac{de}{dt} \quad (2)$$

In the above-described equation, $K_p$, $T_I$, and $T_D$ are feedback gain values in a proportion section 401, an integration section 402, and a differentiation section 403 of the PID control. The feedback gain values are determined by the CPU 201 based on the angular speed of the drive shaft 103.

FIGS. 7A and 7B illustrate a process performed by the slope generation unit 206. The slope generation unit 206 generates the control value (i.e., a speed command value), which linearly increases at a fixed ratio (i.e., a predetermined increase rate) along with time. Referring to FIGS. 7A and 7B, when performing acceleration control, the slope generation unit 206 starts to increment the control value when a count start signal is input from the CPU 201. The slope generation unit 206 increases the control value from an initial value $N_{STA}$ (a first control value) by a predetermined amount ΔK at every predetermined time ΔT (i.e., increases the control value at a predetermined increase rate), to a maximum value $N_{END}$ (a second control value). The slope generation unit 206 then outputs the result as the control value.

The CPU 201 sets the initial value $N_{STA}$ and the maximum value $N_{END}$ to the slope generation unit 206 before inputting the count start signal to the slope generation unit 206. Upon incrementing the control value to the maximum value $N_{END}$, the slope generation unit 206 outputs a count end signal to the CPU 201 to inform that the count has ended, and stops incrementing the control value.

The slope generation unit 206 inputs the control value, which linearly increases at a fixed ratio to a drive signal generation unit 207. The drive signal generation unit 207 then outputs to the motor 100 the PWM signal whose on-duty linearly increases at a fixed ratio.

Figure 8A:
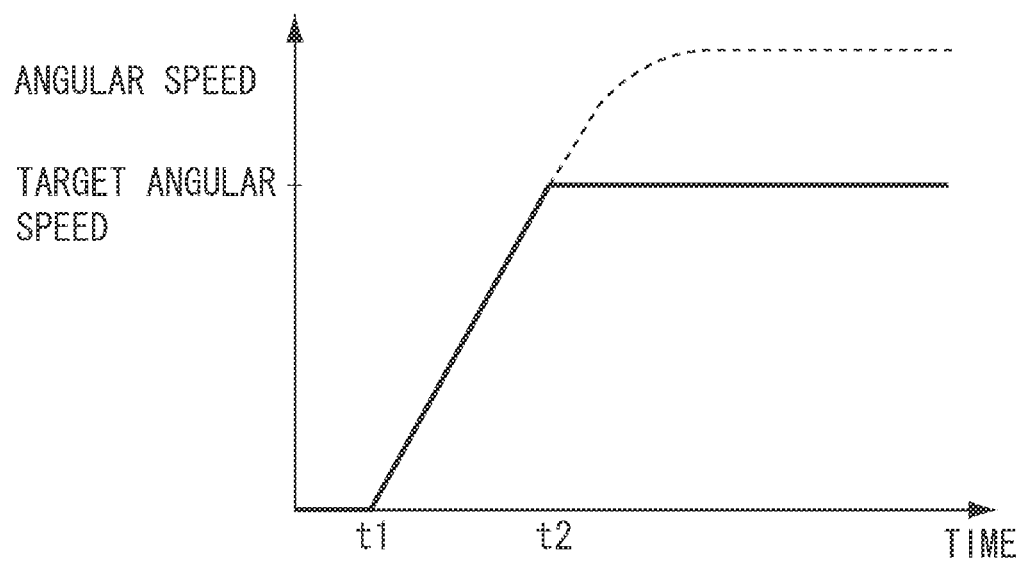
FIGS. 8A and 8B are graphs illustrating a relation between control value and angular speed.
Figure 8B:
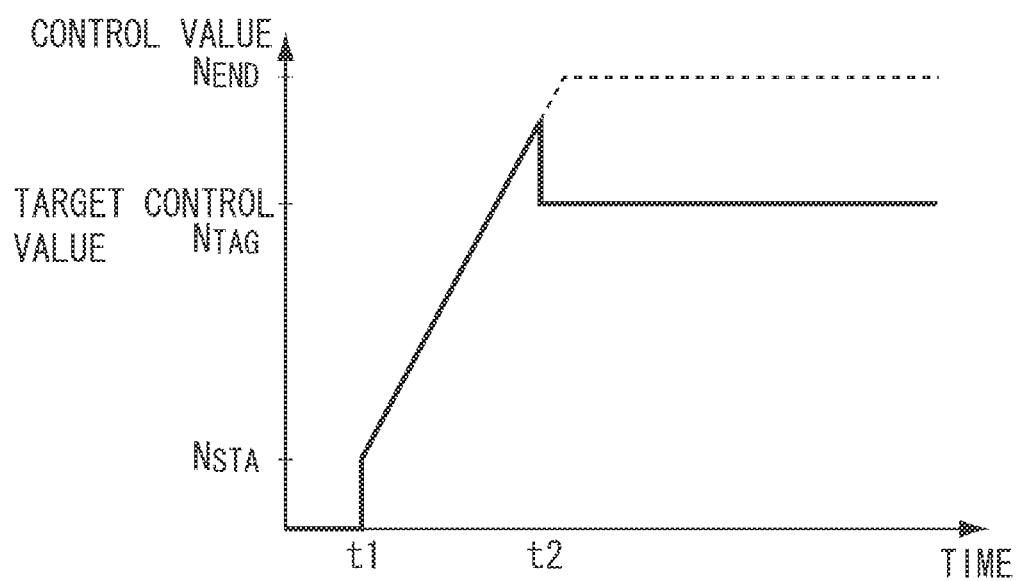

FIGS. 8A and 8B are graphs illustrating a relation between control value and angular speed. Referring to FIGS. 8A and 8B, the angular speed of the motor 100 linearly increases from time t1 to t2, along with the linear increase of the control value from time t1 to time t2. However, when the motor 100 is accelerating, the response of the angular speed of the motor 100 is delayed with respect to the PWM control signal whose on-duty linearly increases. The angular speed of the motor 100 thus does not match the angular speed indicated by the PWM control signal.

If the control value is then changed in a trapezoidal shape as indicated by dotted lines illustrated in FIG. 8B, the start-up characteristic of the angular speed of the motor 100 becomes non-linear as indicated by a dotted line illustrated in FIG. 8A, because the feedback control is performed after the control value is stopped from increasing to bring the angular speed closer to the angular speed corresponding to the control value.

To solve such a problem, the CPU 201 sets the maximum value $N_{END}$ so that the angular speed linearly increases as indicated by the solid line illustrated in FIG. 8A until the angular speed of the motor 100 at least reaches the target angular speed. More specifically, the maximum value $N_{END}$ is set to a value which is greater than the target control value $N_{TAG}$ by a certain percentage for the angular speed of the motor to reach the target angular speed earlier than the control value to be increased reaches the maximum value $N_{END}$. According to the present exemplary embodiment, the CPU 201 sets to the maximum value $N_{END}$ a control value, which instructs an angular speed to be 10% greater than the target angular speed.

As described above, the control value instructed to the motor 100 is linearly increased at a fixed ratio from the first control value corresponding to an angular speed that is less than the target angular speed, to the second control value corresponding to an angular speed that is greater than the target angular speed. In other words, the feed forward control is performed in which the control value instructed to the motor 100 is linearly increased from the first control value corresponding to an angular speed that is less than the target angular speed, to the second control value corresponding to the angular speed that is greater than the target angular speed.

The CPU 201 then accelerates the motor 100 based on the control value output from the slope generation unit 206 from time t1 to time t2 as illustrated in FIG. 8B, until the angular speed of the motor 100 reaches the target angular speed (i.e., at time t2 in FIG. 8A). When the angular speed of the motor 100 reaches the target angular speed (at time t2 in FIG. 8A), The CPU 201 changes the control value to a predetermined third control value $N_{TAG}$ at which the motor 100 is expected to rotate at the target angular speed. This is as indicated by the solid line continuing after time t2 illustrated in FIG. 8B. The CPU 201 then controls the motor 100 to rotate at the target angular speed.

More specifically, upon the motor 100 reaching the target angular speed, the CPU 201 once changes the control value to be instructed to the motor 100 to the predetermined third control value $N_{TAG}$. The CPU 201 then instructs to the motor 100 a fourth control value based on a detection result of the rotation speed detection unit 203.

In other words, upon the motor 100 reaching the target angular speed, the CPU 201 once changes the control value to the predetermined third control value $N_{TAG}$. The CPU 201 then switches to the feedback control in which the fourth control value is instructed to the motor 100 based on a detection result of the rotation speed detection unit 203.

By performing the above-described control, the target angular speed can be maintained after linearly increasing the angular speed of the motor 100 to the target angular speed, as indicated by the solid line illustrated in FIG. 8A. The start-up characteristic of the angular speed of the motor 100 can thus become a trapezoidal shape.

The predetermined time $\Delta T$ and the predetermined amount $\Delta K$ are determined based on a performance, load torque, and inertia of the motor 100. For example, a load of 30 m*Nm and inertia of 400 g*cm$^2$ (including the motor) are connected to a motor whose rated output is 15 W. In such a case, it is desirable to set $\Delta T$ and $\Delta K$ at values which allow the rotation frequency of the motor 100 to increase from 0 rpm to 2000 rpm in approximately 300 ms.

Further, it is desirable for the initial value $N_{STA}$ to be a value at which the motor 100 can start rotating. According to the present exemplary embodiment, the initial value $N_{STA}$ is set to a value at which the on-duty of the PWM control signal becomes approximately 10% to 20%.

Figure 9:
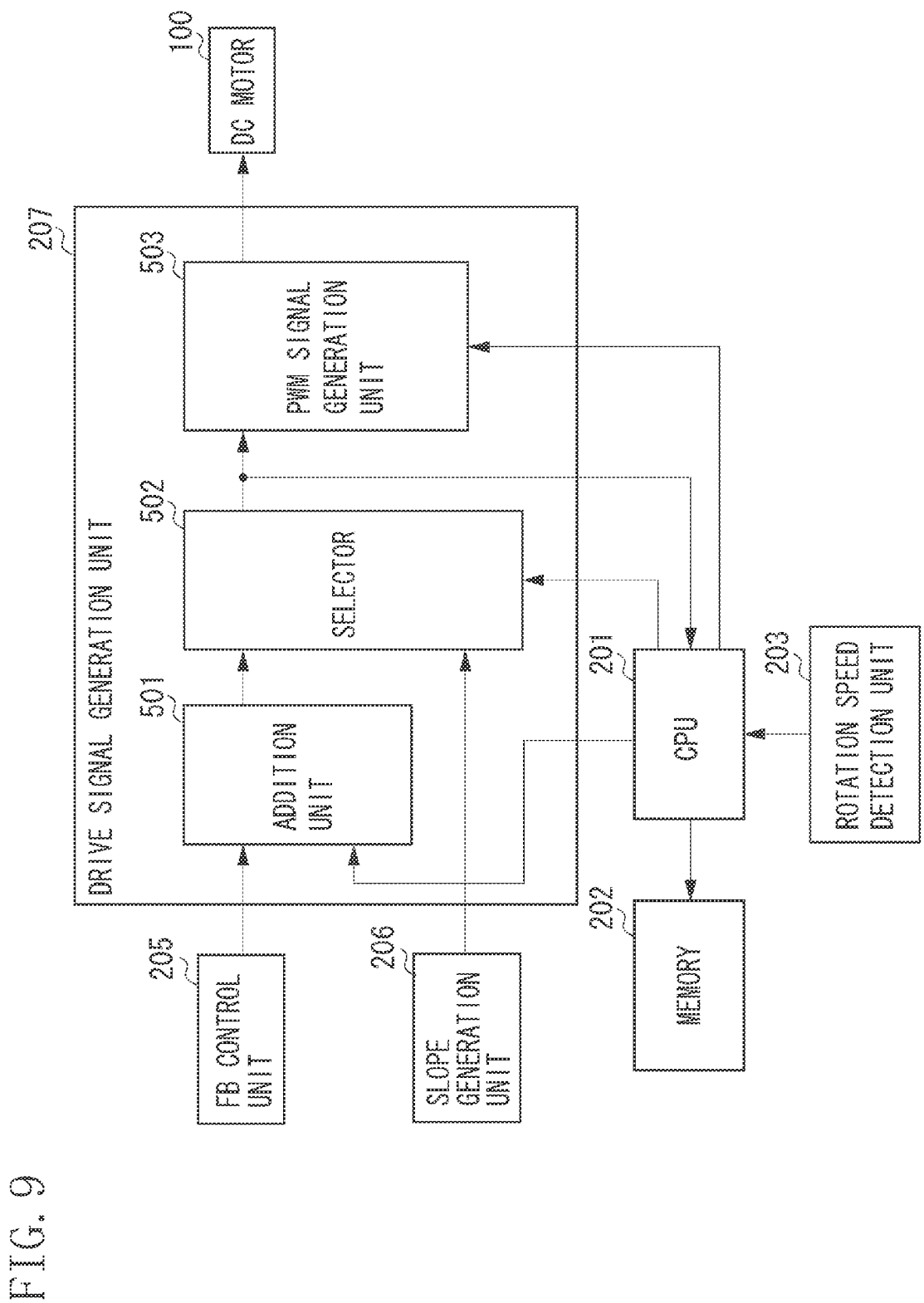
FIG. 9 is a block diagram illustrating the drive signal generation unit 207 of FIG. 3.

FIG. 9 is a block diagram illustrating the drive signal generation unit 207 in the control unit 200. Referring to FIG. 9, an addition unit 501 adds the control value output from the FB control unit 205 and the control value $N_{TAG}$ output from the CPU 201, which instructs the target angular speed. The control values added by the addition unit 501 and the control value generated by the slope generation unit 206 are input to a selector 502.

The selector 502 selects either of the control values input from the slope generation unit 206 and the addition unit 501, based on the signal input from the CPU 201. When accelerating the motor 100, the CPU 201 causes the selector 502 to select the control value input from the slope generation unit 206 until the detection result of the rotation speed detection unit 203 reaches the target angular speed. After the target angular speed is reached, the CPU 201 causes the selector 502 to select the control value input from the addition unit 501.

A PWM signal generation unit 503 generates the PWM control signal based on the control value input from the selector 502 and information about PWM frequency received from the CPU 201. The PWM signal generation unit 503 then supplies the generated PWM signal to the motor 100. Further, the CPU 201 averages the control values (PWM duty) during the time the selector 502 selects the control value input from the addition unit 501 (i.e., while the FB control unit 205 is performing feedback control). The CPU 201 then stores the average control value (i.e., the fourth control value) in a memory 202.

In a subsequent driving of the motor 100, the CPU 201 inputs the average control value stored in the memory 202 to the addition unit 501. In other words, when starting to drive the motor 100, the CPU 201 inputs the previous average control value (the fourth control value) of the motor 100 to the addition unit 501 as the third control value. The target control value input to the addition unit 501 is thus $N_{TAG}$.

Figure 10:
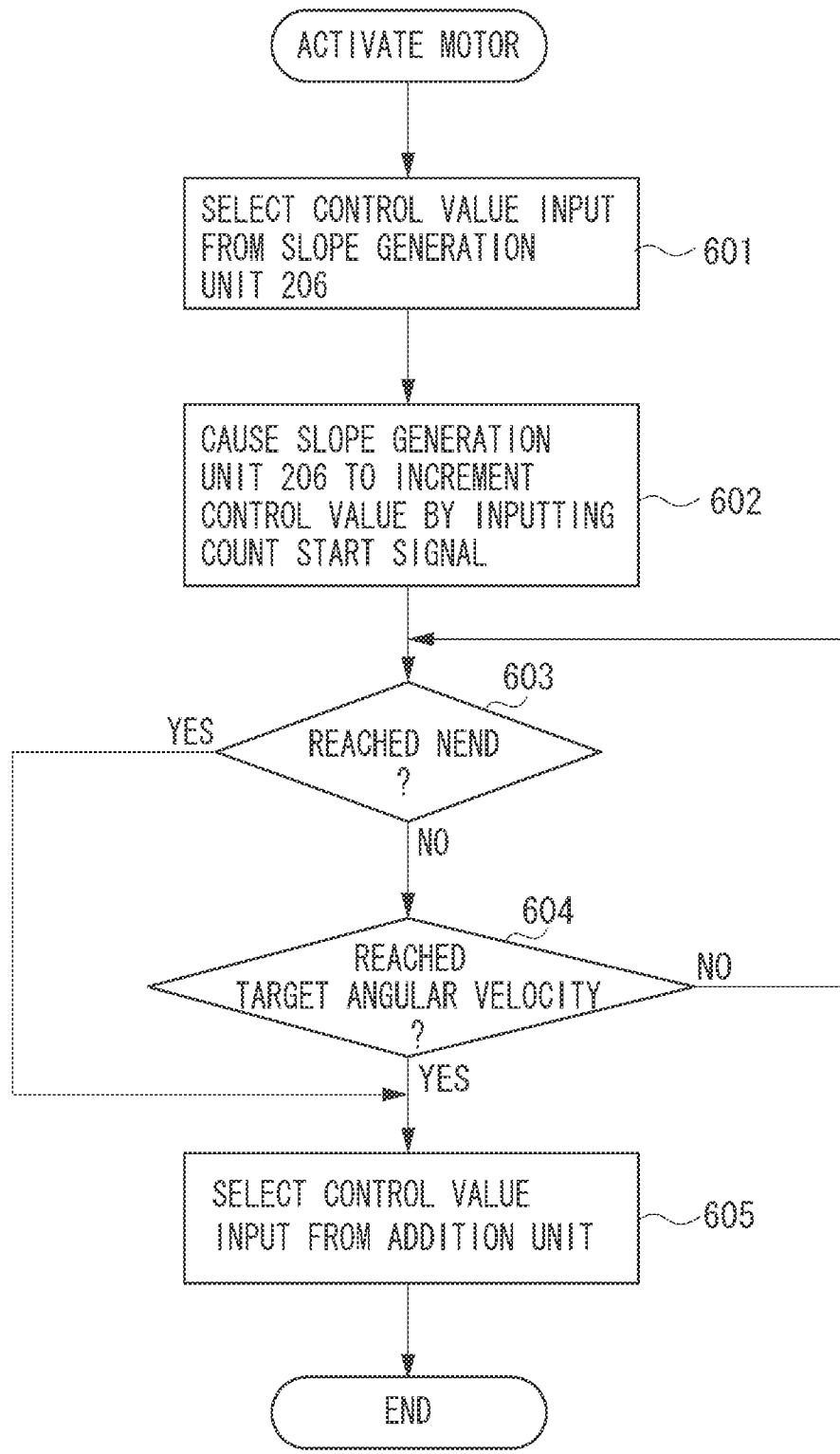
FIG. 10 is a flowchart illustrating a process performed when starting to drive the motor 100 of FIGS. 2 and 3.

FIG. 10 is a flowchart illustrating a process performed by the CPU 201 when the CPU 201 starts driving the motor 100. In step S601, the CPU 201 instructs the selector 502 in the drive signal generation unit 207 to select the control value input from the slope generation unit 206. In step S602, the CPU 201 causes the slope generation unit 206 to start incrementing the control value from the initial value $N_{STA}$ to the maximum value $N_{END}$ according to a count start signal. The control value incremented by the slope generation unit 206 is input to the selector 502.

In step S603, while the slope generation unit 206 is incrementing the control value, the CPU 201 determines whether the control value being incremented has reached the maximum value $N_{END}$ by monitoring whether the slope generation unit 206 has output the count end signal. If the CPU 201 determines that the maximum value $N_{END}$ is not reached (NO in step S603), the process proceeds to step S604. In step S604, the CPU 201 determines whether the angular speed of the motor 100 has reached the target angular speed based on the detection result of the rotation speed detection unit 203.

If the angular speed of the motor 100 has not reached the target angular speed (NO in step S604), the process returns to step S603. On the other hand, if the angular speed of the motor 100 has reached the target angular speed (YES in step S604), the process proceeds to step S605. In step S605, the CPU 201 instructs the selector 502 in the drive signal generation unit 207 to select the control value input from the addition unit 501.

As described above, the CPU 201 inputs the target angular speed to the difference calculation unit 204 and the addition unit 501, and inputs the target control value $N_{TAG}$ to the addition unit 501. Further, the FB control unit 205 is reset when switching from the feed forward control to the feedback control, so that the difference accumulated in the FB control unit 205 is reset.

As a result, the control value input from the addition unit 501 becomes the control value for maintaining the target angular speed. If the control value reaches the maximum value $N_{END}$ before reaching the target angular speed (YES in step S603), the process proceeds to step S605.

The CPU 201 continues to reset the FB control unit 205 (i.e., continues to output a reset signal to the FB control unit 205) while the selector 502 is selecting the control value input from the slope generation unit 206. The CPU 502 cancels resetting of the FB control unit 205 when the selector 502 switches to selecting the control value from the FB control unit 205 (i.e., the addition unit 501). The CPU 201 cancels resetting directly after the feedback control is started or after a predetermined time (e.g., 50 ms) from when the feedback control is started.

If the CPU 201 cancels resetting after a predetermined time from starting the feedback control, the proportion section 401 performs control during the period between starting the feedback control to cancelling resetting. A minute error in the target control value $N_{TAG}$ can thus be corrected.

As described above, since the motor is started to be driven by performing the feed forward control, the slope and the intercept of the start-up characteristic of the motor become different according to the load on the motor. If each of a plurality of motors drives each of a plurality of driven members in contact with each other, the driven members may slip against each other when the start-up characteristics of each of the motors are different.

To prevent such a case, it is necessary to balance the start-up characteristic of each of the motors to have a predetermined slope and intercept. According to the present exemplary embodiment, the start-up characteristic of the motor 100 is detected and then corrected to become closer to a predetermined start-up characteristic.

Figure 11:
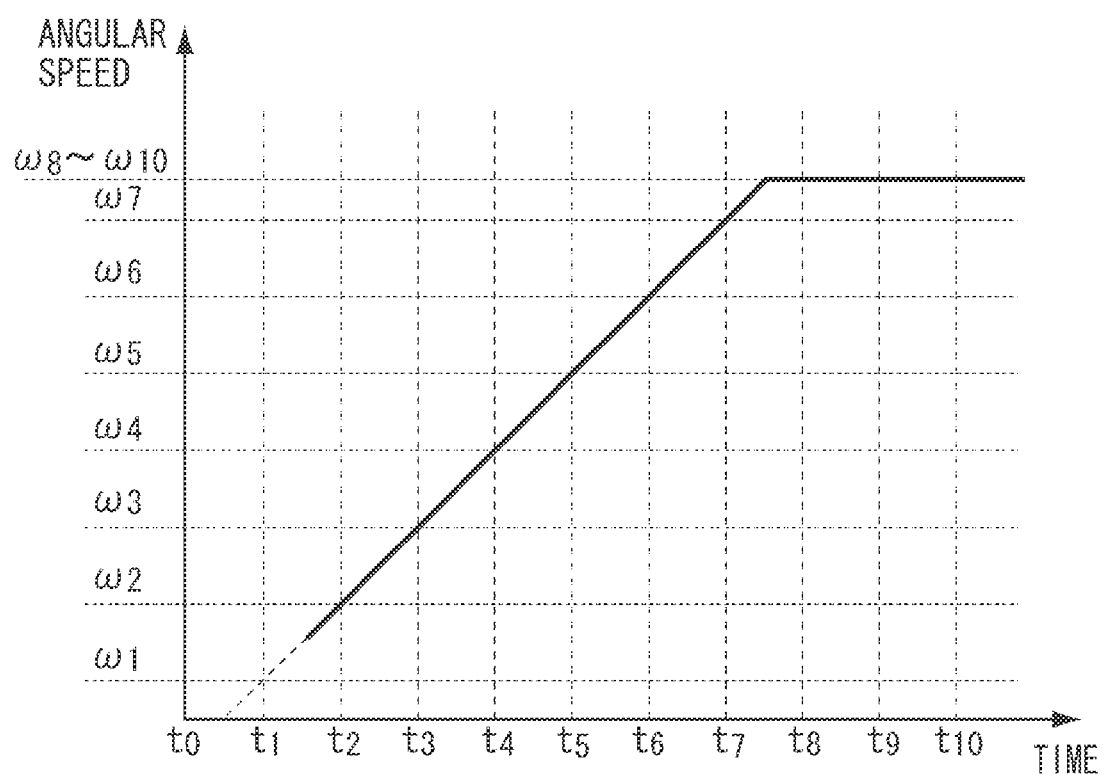
FIG. 11 is a graph illustrating a start-up characteristic of the angular speed of the motor 100 of FIGS. 2 and 3.

A method for detecting the start-up characteristic of the motor 100 will be described below. FIG. 11 illustrates a start-up characteristic of the angular speed of the motor 100. Referring to FIG. 11, time elapsed from the start of outputting the drive signal (PWM control signal) to the motor 100 is indicated on the horizontal axis, and the angular speed of the motor 100 is indicated on the vertical axis. The CPU 201 starts driving the motor at time $t_0$, then performs sampling of the angular speed of the motor 100 at a fixed time interval $\Delta t$ (from time $t_1$ to $t_{10}$), and stores in the memory 202 each of the sampled angular speeds from $\omega_1$ to $\omega_{10}$.

In the example illustrated in FIG. 11, the angular speed linearly increases to the angular speed $\omega_7$ at $t_7$. Further, the angular speeds $\omega_8$, $\omega_9$, and $\omega_{10}$ between time $t_8$ to $t_{10}$ are the same values, and indicate that the target angular speed has been reached. Furthermore, since time $t_1$ is directly after the starting to drive the motor 100, a stable value may not be achieved for angular speed $\omega_1$. The start-up characteristic of the motor 100 is thus acquired by using the angular speeds $\omega_2$ to $\omega_7$ sampled at time $t_2$ to time $t_7$, by omitting the angular speeds directly after the motor is started to be driven and after the target angular speed is reached.

The time interval $\Delta t$ for sampling the angular speed of the motor 100 is set to a value so that at least two angular speeds and preferably six angular speeds can be sampled at times excluding the time directly after the motor is started to be driven and after the target angular speed is reached. For example, if control is performed to reach the target angular speed after 300 ms from starting to drive the motor 100, $\Delta t$ is set between 30 ms and 40 ms.

The CPU 201 thus samples the angular speed at a plurality of points excluding the time directly after the motor is started to be driven and after the target angular speed is reached. The CPU 201 then calculates the intercept of the start-up characteristic (i.e., start timing) of the motor 100 based on the sampling time and the angular speed.

The CPU 201 determines whether a difference between the calculated intercept of the start-up characteristic of the motor 100 and the intercept of a predetermined start-up characteristic is within a predetermined value. The CPU 201 also determines whether a difference between the slope of the start-up characteristic of the motor 100 and the slope of the predetermined start-up characteristic is within a predetermined value. If the differences exceed the predetermined values, the start-up characteristic of the motor 100 is corrected.

A method for correcting the intercept and the slope of the start-up characteristic of the motor 100 will be described below. The intercept of the start-up characteristic corresponds to the time between start of outputting the drive signal (PWM control signal) to the motor 100 to the time when the motor 100 actually starts to be driven.

Figure 12A:
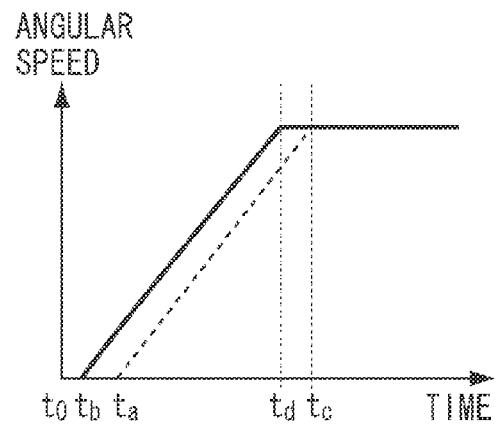
FIGS. 12A, 12B, 12C, and 12D are graphs illustrating methods for correcting an intercept and a slope of a start-up characteristic according to an exemplary embodiment of the present invention.

A method for correcting the intercept of the start-up characteristic will be described below with reference to FIGS. 12A and 12B.

Figure 12C:
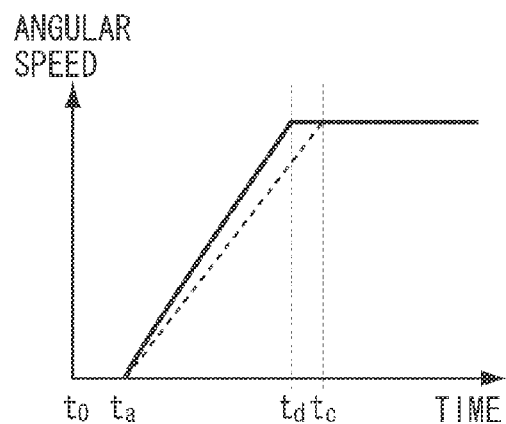
Figure 12B:
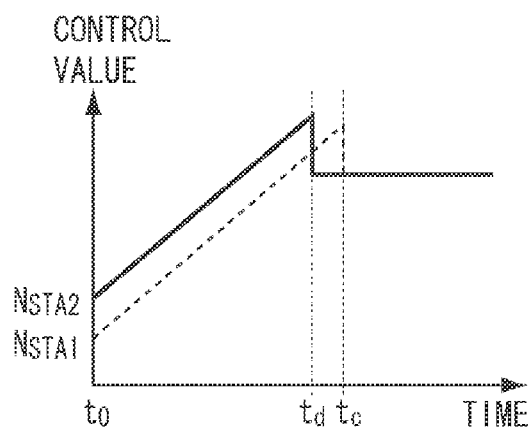

Referring to FIG. 12B, the intercept of the start-up characteristic is changed by changing the initial value of the control value from $N_{STA1}$ (dotted line) to $N_{STA2}$ (solid line). In FIG. 12B, the slope (determined by $\Delta T$ and $\Delta K$ illustrated in FIG. 7) by which the slope generation unit 206 increases the control value is not changed. By changing the initial value as described above, the time at which the motor 100 actually starts to be driven (start timing) changes from $t_a$ (dotted line) to $t_b$ (solid line).

In such a case, the slope of the start-up characteristic hardly changes before and after changing the initial value of the control value. The starting time of the motor can also be changed by shifting output timing of the drive signal. However, since the control becomes complex, the above-described method is desirable.

The method for correcting the slope of the start-up characteristic will be described below with reference to FIGS. 12C and 12D.

Figure 12D:
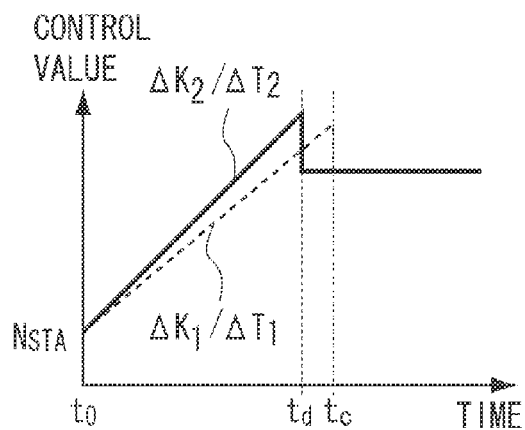

Referring to FIG. 12D, the slope of the start-up characteristic is changed by changing the slope by which the slope generation unit 206 increases the control value. For example, ΔT illustrated in FIG. 7 is changed from $\Delta T_1$ to $\Delta T_2$, or ΔK is changed from $\Delta K_1$ to $\Delta K_2$. In FIG. 12D, the initial value $N_{STA}$ of the control value is not changed. Referring to FIG. 12C, if the slope by which the control value is increased is changed to become a larger slope, the time for the motor 100 to reach the target angular speed becomes $t_d$, which is earlier than time $t_c$ before changing the slope (as indicated by the dotted line).

As described above, either the intercept or the slope of the start-up characteristic is corrected. However, both the intercept and the slope may be corrected. The intercept and the slope of the start-up characteristic of the motor 100 can thus be corrected by changing the initial value $N_{STA}$ of the control value and the slope (ΔT and ΔK) by which the control value is increased.

Figure 13:
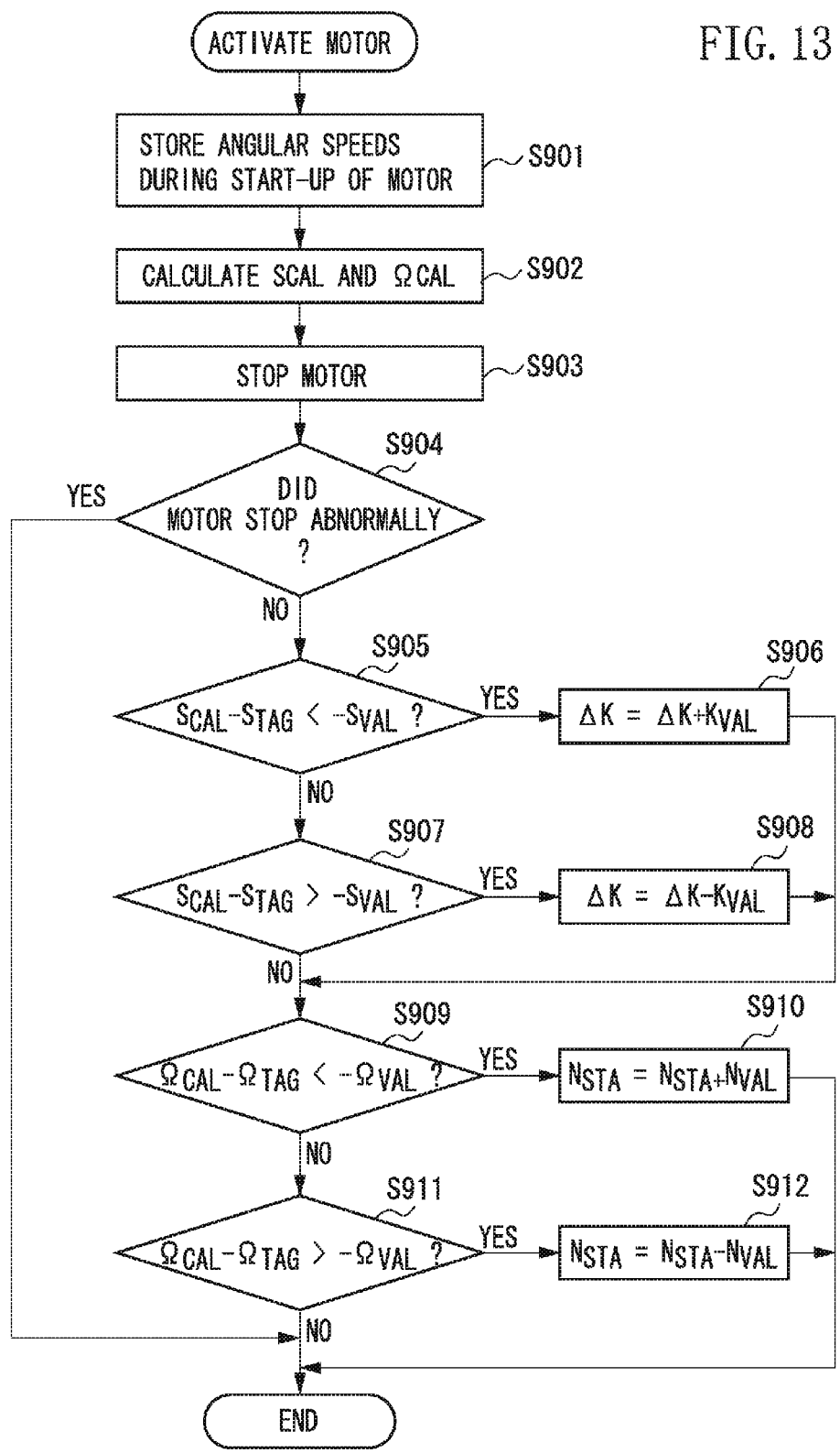
FIG. 13 is a flowchart illustrating a process for correcting a start-up characteristic according to an exemplary embodiment of the present invention.

FIG. 13 is a flowchart illustrating the process performed by the CPU 201 for correcting the start-up characteristic of the motor 100. The CPU 201 performs the process illustrated in FIG. 13 in parallel with the process illustrated in FIG. 10.

In step S901, upon starting to drive the motor 100, The CPU 201 performs sampling of the angular speed of the motor 100 at a fixed time interval Δt (from time $t_1$ to time $t_{10}$). The CPU 201 stores each of the sampled angular speeds as $\omega_1$ to $\omega_{10}$ in the memory 202. In step S902, the CPU 201 acquires the intercept (start timing) $\Omega_{CAL}$ and the slope $S_{CAL}$ of the start-up characteristic of the motor 100 using the angular speeds $\omega_2$ to $\omega_7$ sampled at time $t_2$ to time $t_7$, excluding the time directly after starting to drive the motor 100 and after reaching the target angular speed.

In step S903, the CPU 201 stops the motor 100. In step S904, the CPU 201 determines whether the motor 100 stopped abnormally. The motor 100 stops abnormally if the load on the motor 100 becomes great so that the angular speed of the motor 100 deviates from the target angular speed by a predetermined amount (e.g., ±7%) for a predetermined time (e.g., 1 second or longer). Further, the motor 100 stops abnormally if the signal is not input from the encoder for a predetermined time (e.g., 100 ms).

If the CPU 201 determines that the motor has not stopped abnormally (NO in step S904), the process proceeds to step S905. In step S905, the CPU 201 determines whether a difference between the detected slope of the start-up characteristic $S_{CAL}$ and a target value of the slope $S_{TAG}$ (i.e., $S_{CAL}-S_{TAG}$) is less than a predetermined value $-S_{VAL}$. In other words, the CPU 201 determines whether the detected slope of the start-up characteristic is smaller than the target slope by a predetermined value or greater. The predetermined value $S_{VAL}$ is a threshold value for determining whether to change the slope for increasing the control value.

If the detected slope of the start-up characteristic is smaller than the target slope by a predetermined value or greater (YES in step S905), the process proceeds to step S906. In step S906, the CPU 201 adds a predetermined value $K_{VAL}$ to ΔK stored in the memory 202 (i.e., increases the increase rate by a predetermined amount) to increase the slope of the start-up characteristic. The CPU 201 stores the resulting sum as the new ΔK in the memory 202.

On the other hand, if the difference ($S_{CAL}-S_{TAG}$) is greater than or equal to the predetermined value $-S_{VAL}$ (NO in step S905), the process proceeds to step S907. In step S907, The CPU 201 determines whether the difference ($S_{CAL}-S_{TAG}$) is greater than a predetermined value $S_{VAL}$, i.e., whether the detected slope of the start-up characteristic is larger than the target slope by a predetermined value or greater.

If the detected slope of the start-up characteristic is larger than the target slope by a predetermined value or greater (YES in step S907), the process proceeds to step S908. In step S908, the CPU 201 subtracts the predetermined value $K_{VAL}$ from ΔK stored in the memory 202 (i.e., decreases the increase rate by a predetermined amount) to decrease the slope of the start-up characteristic. The CPU 201 stores the resulting difference as the new ΔK in the memory 202.

If the difference ($S_{CAL}-S_{TAG}$) is less than or equal to the predetermined value $S_{VAL}$ (NO in step S907), the process proceeds to step S909. Further, after performing the processes of step S906 and step S908, the process proceeds to step S909. In step S909, the CPU 201 determines whether the difference between the detected intercept of the start-up characteristic $\Omega_{CAL}$ and a target value of the intercept $\Omega_{TAG}$ (i.e., $\Omega_{CAL}-\Omega_{TAG}$) is less than a predetermined value $-\Omega_{VAL}$. In other words, the CPU 201 determines whether the value of the detected intercept of the start-up characteristic is less than the value of the target intercept by a predetermined value or greater. The predetermined value $\Omega_{VAL}$ is a threshold value for determining whether to change the initial value of the control value.

If the detected intercept value of the start-up characteristic is less than the target intercept value by a predetermined value or greater (YES in step S909), the process proceeds to step S910. In step S910, the CPU 201 adds a predetermined value $N_{VAL}$ to $N_{STA}$ stored in the memory 202 (i.e., increase the first control value by a predetermined amount) to increase the intercept value of the start-up characteristic. The CPU 201 stores the resulting sum as the new $N_{STA}$ in the memory 202. In other words, if timing of detecting the intercept is later than the target timing by a predetermined value or greater, the first control value is increased by a predetermined amount.

On the other hand, if the difference ($\Omega_{CAL}-\Omega_{TAG}$) is greater than or equal to the predetermined value $-\Omega_{VAL}$ (NO in step S909), the process proceeds to step S911. In step S911, the CPU 201 determines whether the difference ($\Omega_{CAL}-\Omega_{TAG}$) is greater than a predetermined value $\Omega_{VAL}$, i.e., whether the detected intercept value of the start-up characteristic is greater than the target intercept value by a predetermined value or greater.

If the detected intercept value of the start-up characteristic is greater than the target intercept value by a predetermined value or greater (YES in step S911), the process proceeds to step S912. In step S912, the CPU 201 subtracts the predetermined value $N_{VAL}$ from $N_{STA}$ stored in the memory 202 (i.e., decrease the first control value by a predetermined amount) to decrease the intercept value of the start-up characteristic. The CPU 201 stores the resulting difference as the new $N_{STA}$ in the memory 202. In other words, if the detected timing is earlier than the target timing by a predetermined value or greater, the first control value is decreased by a predetermined amount.

According to the process illustrated in FIG. 13, the values of the slope and the intercept can only be increased and decreased within a determined range when the motor is driven once. However, since the processes for increasing and decreasing the values of the slope and the intercept are performed each time the motor is driven, correction by load change can be sufficiently performed. Further, if there is a load change that cannot be corrected at once, the load change can be corrected by starting the motor several times, so that the slip scars generated during the period are small enough to be negligible.

As described above, the start-up characteristic of the DC motor when started to be driven is detected based on the detection result. The first control value, i.e., the initial value of the control value, or the increase rate of the control value when the DC motor is started to be driven is then corrected to bring the detected start-up characteristic closer to the predetermined start-up characteristic.

Further, the slope of the start-up characteristic of the DC motor is detected at start time. If the detected slope is smaller than the target slope, the increase rate is increased, and if the detected slope is larger than the target slope, the increase rate is decreased.

More specifically, if the detected slope is smaller than the target slope by a predetermined value or greater, the increase rate is increased by a predetermined amount. If the detected slope is larger than the target slope by a predetermined value or greater, the increase rate is decreased by a predetermined amount. Further, the start timing of the DC motor when started to be driven is detected, and if the detected timing is later than the target timing, the first control value is increased. If the detected timing is earlier than the target timing, the first control value is decreased.

More specifically, if the detected timing is later than the target timing by a predetermined value or greater, the first control value is increased by a predetermined amount. If the detected timing is earlier than the target timing by a predetermined value or greater, the first control value is decreased by a predetermined amount.

The above-described control is applied to the motor 100 that drives each of the photosensitive drums 11, and the motor that drives the drive roller 32 for rotating the intermediate transfer belt 31. As a result, the start-up characteristics of each of the motors become as illustrated in FIG. 8A. In other words, each of the motors can be started up in a predetermined trapezoidal shape regardless of the load on each motor, and the start-up characteristics of the motors can be matched.

Figure 14:
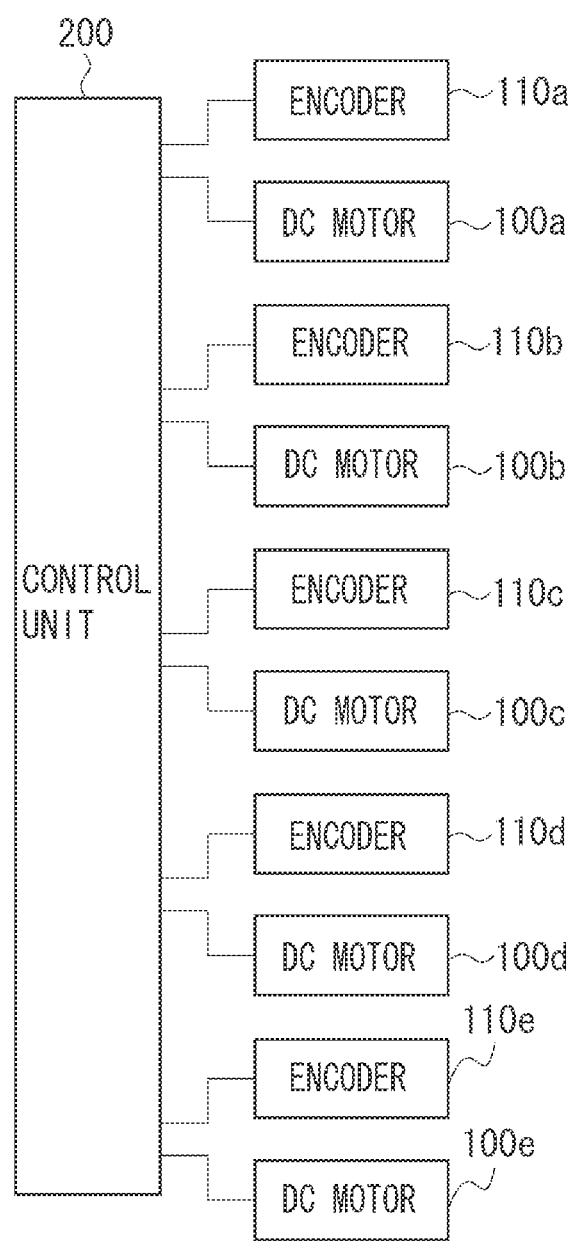
FIG. 14 is a block diagram illustrating the control unit 200 that controls motors 100a, 100b, 100c, 100d, and 100e according to an exemplary embodiment of the present invention.

FIG. 14 is a block diagram illustrating the DC motors 100a, 100b, 100c, and 100d that drive the photosensitive drums 11a, 11b, 11c, and 11d respectively, and a DC motor 100e that drives the drive roller 32, which rotates the intermediate transfer belt 31, as illustrated in FIG. 1.

The control unit 200 detects each of the angular speeds based on the pulse signals output from encoders 110a, 110b, 110c, 110d, and 110e that detect the angular speeds of each driven member driven by the DC motors 100a, 100b, 100c, 100d, and 100e. The control unit 200 then detects the start-up characteristics of the DC motors 100a, 100b, 100c, 100d, and 100e and corrects the first control value or the increase rate of each of the start-up characteristics so that the start-up characteristics match each other. As a result, the peripheral speed difference between the photosensitive drum 11 and the intermediate transfer belt 31 can be avoided. The slipping of the photosensitive drum and the intermediate transfer belt at the primary transfer portion can thus be prevented, and the photosensitive drum and the intermediate transfer belt can be prevented from becoming scratched.

Further, if the drive motor of either the photosensitive drum 11 or the intermediate transfer belt 31 is a stepping motor, the stepping motor can be started up in the trapezoidal shape by a known control. Therefore, the circumferential speed difference between the photosensitive drum 11 and the intermediate transfer belt 31 can be avoided by matching the start-up characteristic of the DC motor with the start-up characteristic of the stepping motor.

As a result, the slipping of the photosensitive drum and the intermediate transfer belt at the primary transfer portion can thus be prevented, and the photosensitive drum and the intermediate transfer belt can be prevented from becoming scratched.

According to the present exemplary embodiment, the encoder 110 attached to the drive shaft 103 detects the angular speed of the motor 100. However, the angular speed can be detected based on an FG (Frequency Generator) signal output from the motor 100. Further, the above-described process may be performed based on a result of detecting the peripheral speeds of the photosensitive drum and the intermediate transfer belt.

Furthermore, according to the present exemplary embodiment, the PWM control is performed on the motor 100 based on the control value. However, a voltage control may be performed on the motor 100 based on the control value.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2009-155305 filed Jun. 30, 2009, which is hereby incorporated by reference herein in its entirety.

What is claimed is:

1. A motor control apparatus that controls a direct current (DC) motor, the apparatus comprising:
    a detection unit configured to detect an angular speed of the DC motor;
    a driven member configured to be driven by the DC motor; and
    a control unit configured to increase, when starting to drive the DC motor, a control value for controlling driving of the DC motor from a first control value to a second control value at an increase rate,
    wherein the control unit detects a start-up characteristic of the DC motor based on a detection result of the detection unit, and corrects the first control value or the increase rate according to a result of comparing a detected start-up characteristic and a predetermined start-up characteristic such that the start-up characteristic of the DC motor becomes closer to the predetermined start-up characteristic, and
    wherein the control unit increases, when starting to drive the DC motor, a control value for controlling drive of the DC motor from the first control value corresponding to an angular speed that is less than a target angular speed to the second control value corresponding to an angular speed that is greater than the target angular speed, by the predetermined increase rate, and switches the control value to a third control value corresponding to the target angular speed in accordance with the detection unit detecting the target angular speed.

2. The motor control apparatus according to claim 1, wherein the control unit detects a slope of a start-up characteristic of the DC motor when started to be driven, and increases the increase rate if a detected slope is smaller than a target slope, and decreases the predetermined increase rate if a detected slope is larger than the target slope.

3. The motor control apparatus according to claim 1, wherein the control unit detects a slope of a start-up characteristic of the DC motor when started to be driven, and increases the increase rate by a predetermined amount if a detected slope is smaller than a target slope by a predetermined value or greater, and decreases the predetermined increase rate by a predetermined amount if a detected slope is larger than the target slope by a predetermined value or greater.

4. The motor control apparatus according to claim 1, wherein the control unit detects a start timing of the DC motor when starting to drive the DC motor, and increases the first control value if detected timing is later than target timing, and decreases the first control value if detected timing is earlier than the target timing.

5. The motor control apparatus according to claim 1, wherein the control unit detects a start timing of the DC motor when starting to drive the DC motor, and increases the first control value by a predetermined amount if detected timing is later than target timing by a predetermined value or greater, and decreases the first control value by a predetermined amount if detected timing is earlier than target timing by a predetermined value or greater.

6. The motor control apparatus according to claim 1, wherein the control value is a speed instruction value.

7. The motor control apparatus according to claim 1, further comprising a signal generation unit configured to generate a signal for performing pulse width modulation control on the DC motor based on the control value instructed by the control unit.

8. The motor control apparatus according to claim 1, wherein the control unit switches, after switching a control value for controlling drive of the DC motor to the third control value, to a feedback control, which controls the control value based on a detection result of the detection unit to maintain the target angular speed of the DC motor.

9. An image forming apparatus comprising the motor control apparatus according to claim 1, configured to drive, by using the DC motor, a photosensitive drum or an intermediate transfer belt for forming an image on a recording material.

10. The image forming apparatus according to claim 9, wherein the detection unit is an encoder configured to detect an angular speed of a drive shaft of the photosensitive drum or the intermediate transfer belt.

* * * * *